Feb. 2, 1932. G. O. OLSEN 1,843,369
METHOD OF MANUFACTURING SURFACING MATERIAL
Filed Feb. 10, 1930
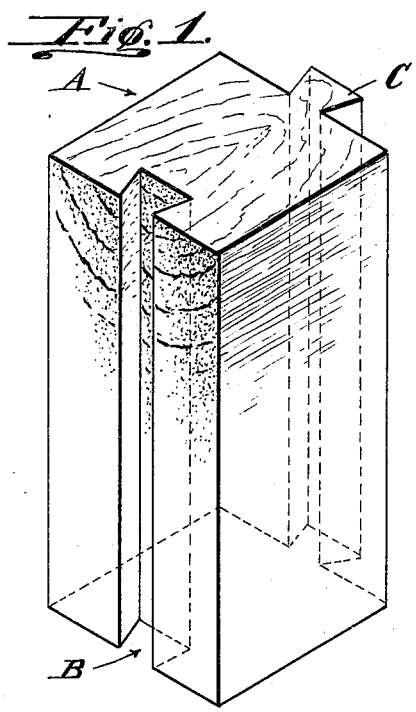
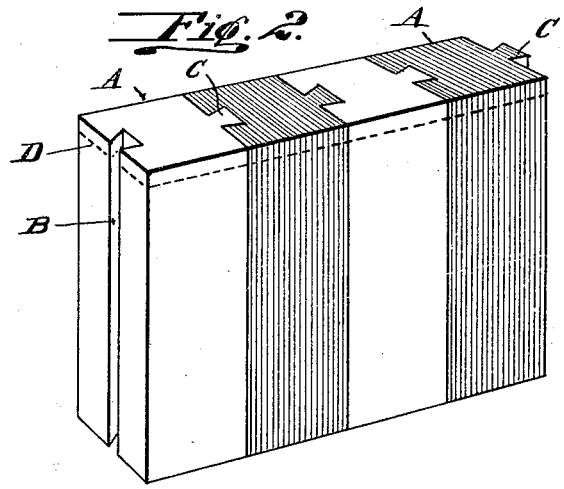
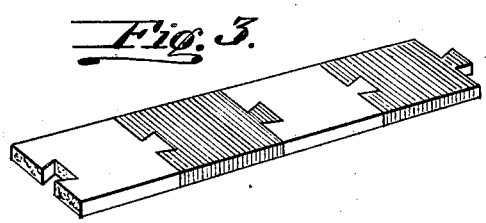
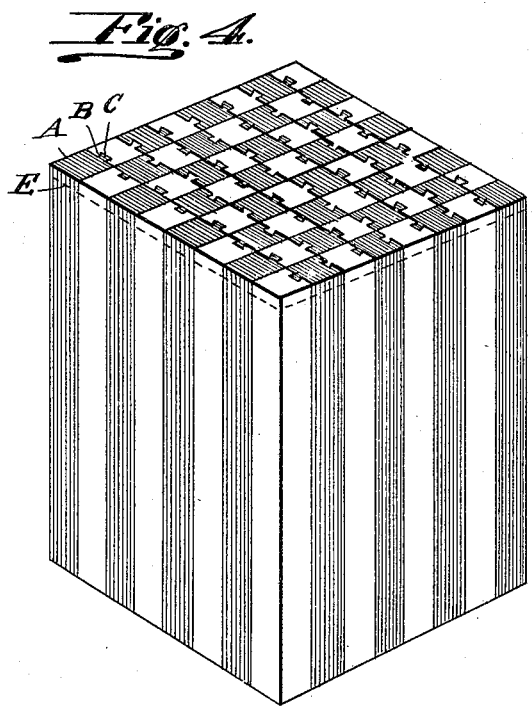
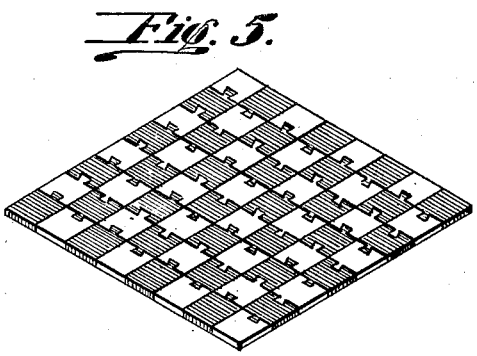
Inventor:
George O. Olsen
By R. S. Berry
Atty.

Patented Feb. 2, 1932

1,843,369

UNITED STATES PATENT OFFICE

GEORGE O. OLSEN, OF LOS ANGELES, CALIFORNIA

METHOD OF MANUFACTURING SURFACING MATERIAL

Application filed February 10, 1930. Serial No. 427,248.

This invention relates to a method of manufacturing surfacing material, and more particularly pertains to a method of forming strips or sheets of material embodying a row or rows of alternately colored blocks. An object of the invention is to provide a method whereby strips or sheets may be readily formed of alternately colored blocks of wood or similar material in which the contiguous blocks are interconnected by dovetail joints arranged with the joints exposed to view on the surface of the strip or sheet.

Another object is to provide a surface covering or veneer composed of alternately colored blocks formed in representation of inlays.

A further object is to produce a method of fabricating strip or sheet material of the above character whereby the surfacing strips or sheets may be readily, accurately and economically constructed.

With the foregoing objects in view, together with such other objects and advantages as may subsequently appear, the invention resides in the steps and features hereinafter set forth and illustrated by way of example in the accompanying drawings, in which:

Fig. 1 is a perspective view of a block as initially formed preparatory to assembling in interconnection with correspondingly formed blocks;

Fig. 2 is a view in perspective illustrating the manner of assembling a series of blocks formed as shown in Fig. 1 to produce a line or row of such blocks with alternate blocks formed of different colors;

Fig. 3 is a perspective view illustrating the manner of forming a relatively thin strip by severing the assembled blocks shown in Fig. 2;

Fig. 4 is a perspective view illustrating the manner of assembling a series of rows of the assembled blocks such as shown in Fig. 2 preparatory to forming panels of checkered character;

Fig. 5 is a perspective view of a panel formed by severance from an assembled group of blocks as shown in Fig. 4.
In carrying out the invention, I take a series of rectangular blocks A of wood of suitable dimensions and form a dovetail channel B on one side of each of the blocks extending throughout its length and opening to the ends thereof and I form a rib or tongue C of dovetail cross-section on the side of the block opposite that formed with the dovetail channel B. The blocks thus formed are assembled together in a row as shown in Fig. 2 by inserting the dovetail rib C longitudinally into a dovetail channel B on the adjacent block; the walls of the channel B and the faces of the tongue C being of substantially corresponding dimensions so that when the blocks are interconnected the contiguous faces thereof will be in close contact. In assembling the blocks in the manner described the contiguous surfaces thereof are adhered together by a suitable adhesive such as glue; the assembled blocks being subjected to pressure in the direction of the length of the row thereof while the adhesive is setting so as to insure secure adhesion between the contiguous blocks. The row of blocks thus formed may be of any suitable length. In order to obtain the desired results the alternate blocks in the assembled row are formed of woods of different colors, such, for example, as maple and walnut; the woods being selected according to the color effect to be obtained in the finished product.

In forming the block A, the channel B and the tongue C are formed on the cross or butt sections of the block; the other sides of the block then comprising the radial section, and the ends of the block constituting the tangential section, which latter in the finished product will form the finished surface.

Where it is desired to produce strips or moldings from the row of assembled blocks, the latter is severed along its tangential section as indicated by the dotted line D in Fig. 2, thus forming a strip as illustrated in Fig. 3 consisting of alternately colored blocks interconnected by the dovetail joint between contiguous blocks, with the dovetail joint exposed on the top surface of the strip.

Where it is desired to form a panel of checkered appearance, a series of the strips, as shown in Fig. 3, may be assembled side by side in any desired arrangement but where it is desired to form a plurality of panels of given dimensions such, for example, as a checker or a chess board, a series of rows of the blocks may be adhered together side by side to form a rectangular fabricated block as shown in Fig. 4; the continguous rows of the blocks being arranged so that the blocks of alternate colors of adjacent rows will alternate relatively to each other so that the end face of the assembled block will present a checkered appearance.

After thus forming the fabricated block as shown in Fig. 4, it is severed parallel with the end face thereof as indicated by the dotted line E thus forming a checkered panel as shown in Fig. 5 which may be mounted on any suitable backing, such for example as a board formed of several plies of wood.

The strips and panels formed by my method may be of any desired thickness and obviously may be made quite thin to serve as a veneer where desired.

The strips as formed in Fig. 3 may be used either as moldings or in assembling panel work, and may be employed as flooring, in which latter event, they are formed with marginal tongues and grooves in a well known manner, not necessary to be here shown.

Panels formed in accordance with my invention may be utilized for various purposes as in the construction of game boards, table tops, doors, wainscoting or any other panel work or surfacing.

The exposed surface of the strips or panels may obviously be finished in any desired manner as by applying suitable surface finishes and as by polishing.

While I have shown and described the invention as applied to blocks of wood, it is obvious that the blocks may be formed of suitable compositions adapted to be severed to form the strips or panels.

I claim:

The method of forming a surfacing material consisting in forming blocks of wood with a dovetail channel on one side thereof and a dovetail rib on the side opposite the channelled side, said channel and rib being formed across the grain of the block and ending in a plane parallel to the grain thereof, assembling a series of blocks thus formed in a row with contiguous blocks interconnected by the dovetail rib of one block interengaging the dovetail channel of the adjacent block, said row of blocks being formed of blocks of alternate colors and finally severing the blocks along a plane parallel with the grain thereof.

GEORGE O. OLSEN.